(12) United States Patent
Kang (10) Patent No.: US 8,878,696 B2
(45) Date of Patent: Nov. 4, 2014

(54) PARKING CONTROL APPARATUS AND METHOD FOR PROVIDING AN ALARM THEREOF

(71) Applicant: Mando Corporation, Pyeongtaek-si (KR)

(72) Inventor: Tae Seok Kang, Suwon-si (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 29 days.

(21) Appl. No.: 13/856,863

(22) Filed: Apr. 4, 2013

(65) Prior Publication Data
US 2013/0265175 A1 Oct. 10, 2013

(30) Foreign Application Priority Data

Apr. 4, 2012 (KR) .................. 10-2012-0034715

(51) Int. Cl.
*G08G 1/14* (2006.01)
*B60Q 1/48* (2006.01)
*B60Q 9/00* (2006.01)
*G08G 1/16* (2006.01)
*B62D 15/02* (2006.01)

(52) U.S. Cl.
CPC *G08G 1/168* (2013.01); *B60Q 9/00* (2013.01); *B60Q 9/006* (2013.01); *B62D 15/029* (2013.01); *B62D 15/0285* (2013.01)
USPC ......... 340/932.2; 340/435; 340/436; 340/903

(58) Field of Classification Search
USPC .............. 340/932.2, 435, 436, 903, 437, 438, 340/686.1, 686.6; 180/167, 168
See application file for complete search history.

(56) References Cited

U.S. PATENT DOCUMENTS 5,572,484 A * 11/1996 Gaus et al. ...................... 367/99

* cited by examiner

*Primary Examiner* — Toan N Pham
(74) *Attorney, Agent, or Firm* — McDermott Will & Emery LLP (57) ABSTRACT

The present invention relates to a vehicle alarm control technique. More particularly, the present invention relates to a parking control apparatus and a method for providing an alarm accurately as detecting a collision risk of a vehicle with an obstacle in advance during all the time while the vehicle moves under parking control.

5 Claims, 6 Drawing Sheets

PARKING CONTROL APPARATUS AND METHOD FOR PROVIDING AN ALARM THEREOF

CROSS-REFERENCE TO RELATED APPLICATION

This application claims priority from and the benefit under 35 U.S.C. §119(a) of Korean Patent Application No. 10-2012-0034715, filed on April 4, which is hereby incorporated by reference for all purposes as if fully set forth herein.

BACKGROUND OF THE INVENTION

1. Field of the invention

The present invention relates to a vehicle alarm technique.

2. Description of the Prior Art

A conventional parking control device performs parking control to park a vehicle on a parking space between obstacles. Further, the parking control device may sense a possible collision of the vehicle with nearby obstacles while the vehicle moves to park under control thereof and provide an alarm.

The parking control device has to precisely detect obstacles using sensors such as an ultrasonic sensor equipped to the vehicle to perform the vehicle parking control and provide an alarm as described above.

If the vehicle is equipped with sensors in all directions then the parking control device may acquire information on distances from the vehicle to the obstacles and provide an alarm to prevent a collision throughout the movement of the vehicle under parking control thereof.

However, vehicles are generally not equipped with sensors in all directions due to considerations such as a vehicle design plan, install position of sensors and the price of the sensors.

Therefore, the parking control device may not acquire information on minimal distances from the vehicle to the obstacles when the vehicle moves while a part of the vehicle without any sensor faces the obstacles, thereby possibly causing collision of the vehicle with the obstacle.

SUMMARY OF THE INVENTION

Additional features of the invention will be set forth in the description which follows, and in part will be apparent from the description, or may be learned by practice of the invention.

Accordingly, the present invention has been made to solve the above-mentioned problems occurring in the prior art, and an object of the present invention is to provide a parking control apparatus configured to sense risk of collision of a vehicle with an obstacle in advance to provide an alarm while the vehicle moves under control thereof.

Another object of the present invention is to provide a parking control apparatus configured to sense risk of collision of a side of a vehicle with an obstacle in advance to provide an alarm while the vehicle moves under control thereof even without location information of the obstacle through a sensor, and a method of controlling the same.

In order to accomplish this object, there is provided a method for providing an alarm by a parking control apparatus comprising: acquiring vehicle location informations repetitively based on at least one of wheel signal and steering angle signal, and repetitively acquiring to store obstacle location informations based on distance informations from a vehicle to an obstacle on a periphery of a parking space through sensors installed to the vehicle while the vehicle moves under parking control to park on the parking space; acquiring a first side distance information from a side part of the vehicle to the obstacle based on a currently acquired obstacle location information and a currently acquired vehicle location information if the obstacle location information is obtainable; acquiring a second side distance information from the side part of the vehicle to the obstacle based on a previously stored obstacle location information and the currently acquired vehicle location information if the obstacle location information is not obtainable; and providing a side alarm for a broadside collision risk of the vehicle according to comparison between reference distance information and either the first side distance information or the second side distance information.

The acquiring of the vehicle location information may acquire a vehicle location information moved from a reference location information according to a movement distance and a rotation angle based on at least one of the wheel signal and the steering angle signal, wherein the reference location information is a vehicle location information at a time when the parking control starts.

In the second side distance acquiring step the side part of the vehicle may be not installed with any sensor.

In accordance with another aspect of the present invention, there is provided a parking control apparatus comprising: an obstacle location information acquiring unit for repetitively acquiring obstacle location informations based on distance informations from a vehicle to an obstacle on a periphery of a parking space through sensors installed to the vehicle while the vehicle moves under parking control to park on the parking space; an obstacle location information storing unit for storing the acquired obstacle location informations while the vehicle moves under parking control; a vehicle location information acquiring unit for repetitively acquiring vehicle location information based on at least one of wheel signal and steering angle signal while the vehicle moves under parking control to park on the parking space; a first side distance information acquiring unit acquiring a first side distance information from a side part of the vehicle to the obstacle based on a currently acquired obstacle location information and a currently acquired vehicle location information if the obstacle location information is obtainable; a second side distance information acquiring unit for acquiring a second side distance information from the side part of the vehicle to the obstacle based on a previously stored obstacle location information and the currently acquired vehicle location information if the obstacle location information is not obtainable; and a side alarm providing unit for providing an alarm for collision risk of the vehicle according to comparison between a reference distance information and either the first side distance information or the second side distance information.

In accordance with yet another aspect of the present invention, there is provided a parking control apparatus comprising: an obstacle location information acquiring and storing unit for repetitively acquiring and storing obstacle location informations based on distance informations from a vehicle to an obstacle on a periphery of a parking space through sensors installed to the vehicle while the vehicle moves under parking control to park on the parking space; a vehicle location information acquiring unit for repetitively acquiring vehicle location information based on at least one of wheel signal and steering angle signal while the vehicle moves under parking control to park on the parking space; a minimal distance information acquiring unit for acquiring a first minimal distance information from the vehicle to the obstacle based on a currently acquired obstacle location information and a currently acquired vehicle location information if the obstacle location information is obtainable, and for acquiring a second minimal distance information from the side part of the vehicle to the obstacle based on a previously stored obstacle location information and the currently acquired vehicle location information if the obstacle location information is not obtainable; and an alarm providing unit for providing an alarm for collision risk of the vehicle according to comparison between reference distance information and either the first minimal distance information or the second minimal distance information.

As described above, according to the present invention, it is possible to provide an alarm accurately as detecting a collision risk of a vehicle with an obstacle in advance during all the time while the vehicle moves under parking control.

In addition, according to the present invention, it is possible to provide an alarm accurately as detecting a broadside collision risk of a side of a vehicle with an obstacle in advance even when location information on the obstacle is not obtainable through a sensor while the vehicle moves under parking control.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE PREFERRED EMBODIMENTS

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. Various changes, modifications, and equivalents of the systems, apparatuses, and/or methods described herein will likely suggest themselves to those of ordinary skill in the art. Elements, features, and structures are denoted by the same reference numerals throughout the drawings and the detailed description, and the size and proportions of some elements may be exaggerated in the drawings for clarity and convenience.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
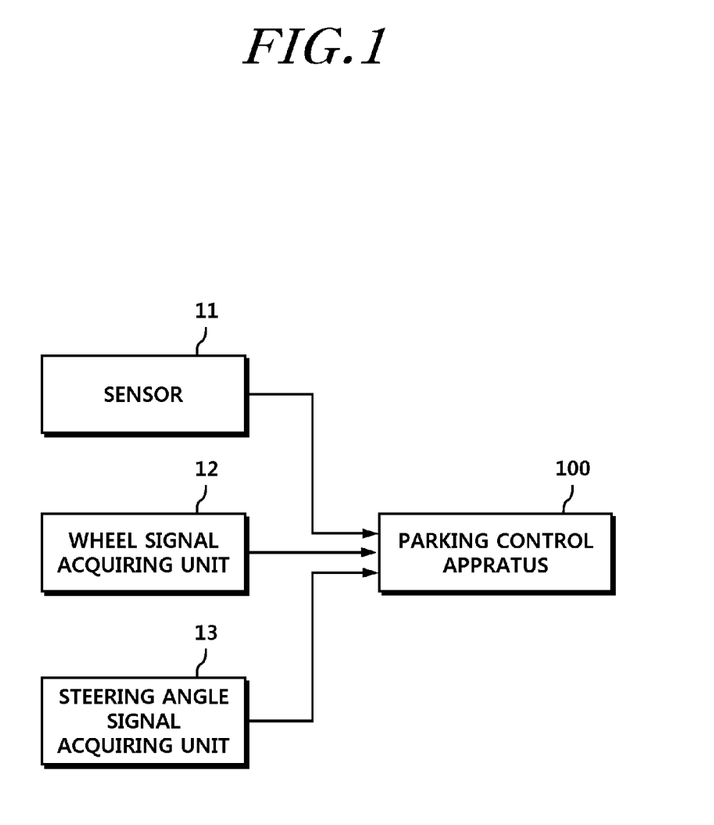
FIG. 1 is a block diagram of a parking control apparatus with peripheral devices according to an exemplary embodiment of the present invention.

FIG. 1 is a block diagram of a parking control apparatus 100 with peripheral devices 11, 12 and 13 according to an exemplary embodiment of the present invention.

Referring to FIG. 1, the parking control apparatus 100 according to the exemplary embodiment of the present invention performs a parking control to park a vehicle on a parking space between obstacles.

The parking control apparatus 100 may provide an alarm as sensing a possible collision risk of the vehicle with obstacles on the periphery thereof while the vehicle moves under parking control.

The parking control apparatus 100 utilizes sensors 11 such as an ultrasonic sensor installed to the vehicle for the purpose such as parking space recognition and obstacle detection.

If the vehicle is equipped with sensors 11 in all directions, the parking control apparatus 100 may acquire distance information from the vehicle to the obstacles and provide an alarm to prevent a collision throughout the movement of the vehicle under parking control thereof.

However, vehicles are generally not equipped with sensors 11 in all directions due to considerations such as a vehicle design plan, install position of sensors and the price of the sensors. Therefore, the parking control device may not acquire information on minimal distances from the vehicle to the obstacles when the vehicle moves while a part of the vehicle without any sensor faces the obstacles, thereby possibly causing collision of the vehicle with the obstacles.

Figure 4:
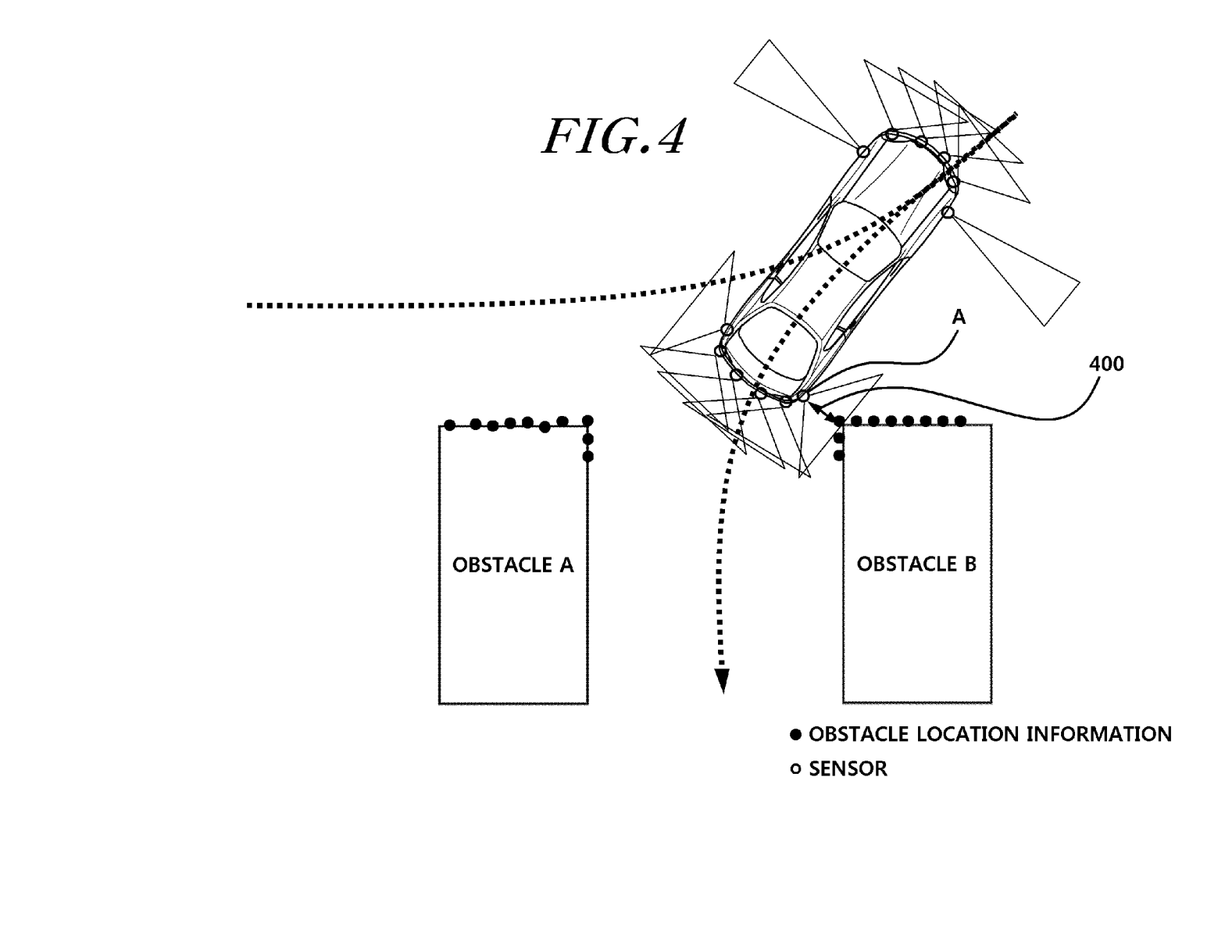
FIGS. 4 and 5 are drawings illustrating examples of providing side impact protection alarms by the parking control apparatus according to the exemplary embodiment of the present invention.
Figure 5:
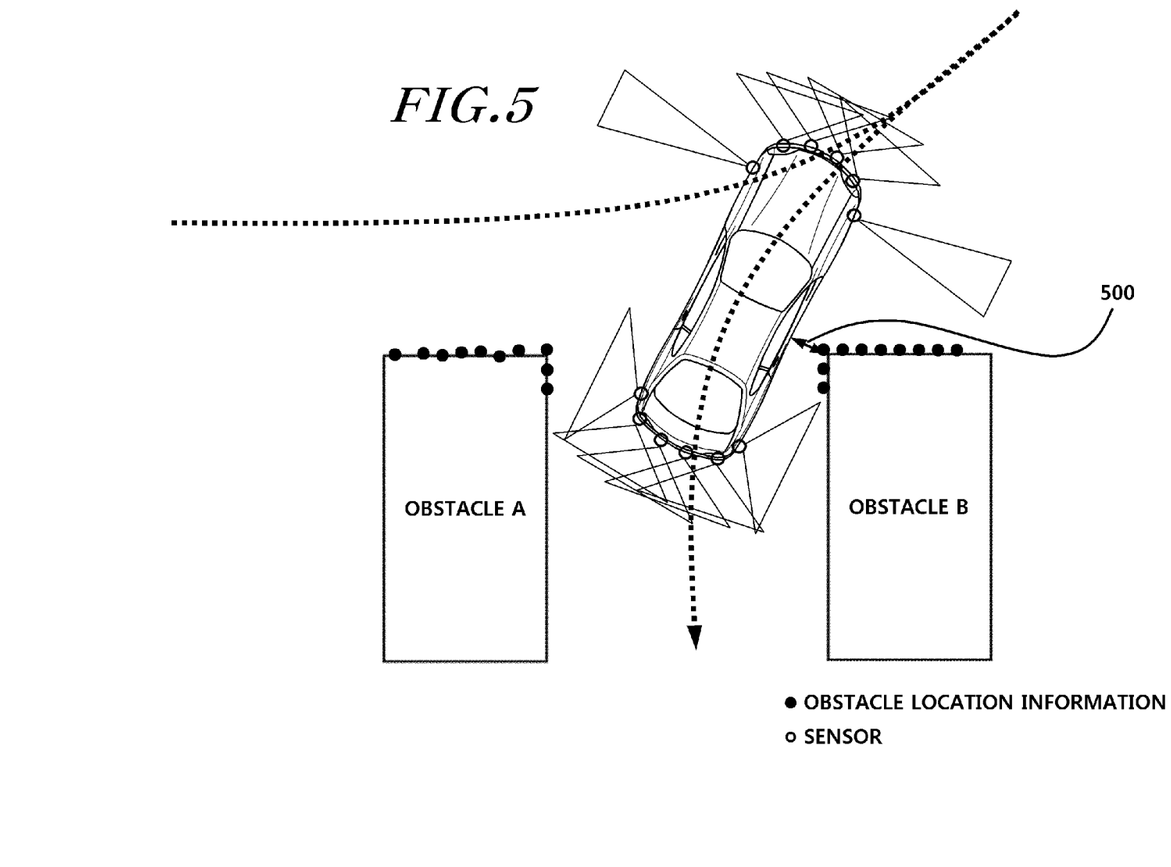

The sensors 11 are not generally installed in all directions of the vehicle, but the sensors 11 are mostly installed to a front and rear of the vehicle except a side of the vehicle as shown in FIGS. 4 and 5.

Even when the sensors 11 are not installed in all directions of the vehicle as described, the parking control apparatus 100 according to the exemplary embodiment of the present invention may provide an alarm accurately to prevent a collision with the obstacles during all the time while the vehicle moves under parking control.

Especially, the parking control apparatus 100 according to the exemplary embodiment of the present invention may accurately provide a "side alarm of the vehicle" which may not be provided according to the conventional obstacle collision prevention technique. The "side alarm of the vehicle" is a side impact protection alarm provided while the vehicle moves under parking control.

To this end, the parking control apparatus 100 according to the embodiment of the present invention utilizes the sensors 11 to acquire and store obstacle location informations of an obstacle on the periphery of the parking space, and acquires vehicle location informations based on at least one of wheel signal from the wheel signal acquiring unit 12 and steering angle signal from the steering signal acquiring unit 13.

The parking control apparatus 100 may acquire a distance information (hereinafter, a first side distance information) from a side part of the vehicle to the obstacle based on a currently acquired obstacle location information and a currently acquired vehicle location information if the obstacle location information based on the distance information from the vehicle to the obstacle is obtainable through the sensors 11.

If the obstacle location information based on the distance information from the vehicle to the obstacle is not obtainable through the sensors 11, the parking control apparatus 100 may acquire a distance information (hereinafter, a second side distance information) from the side part of the vehicle to the obstacle based on a previously stored obstacle location information and the currently acquired vehicle location information.

In this document, each of the first and second side distance information is minimal side distance information from the nearest side part of the vehicle among various part of the vehicle to the obstacle.

The parking control apparatus 100 may provide a side alarm of the vehicle using the first and second side distance information as described above.

Hereinafter, the parking control apparatus 100 according to the embodiment of the present invention will be described in more detail with reference to FIG. 2.

Figure 2:
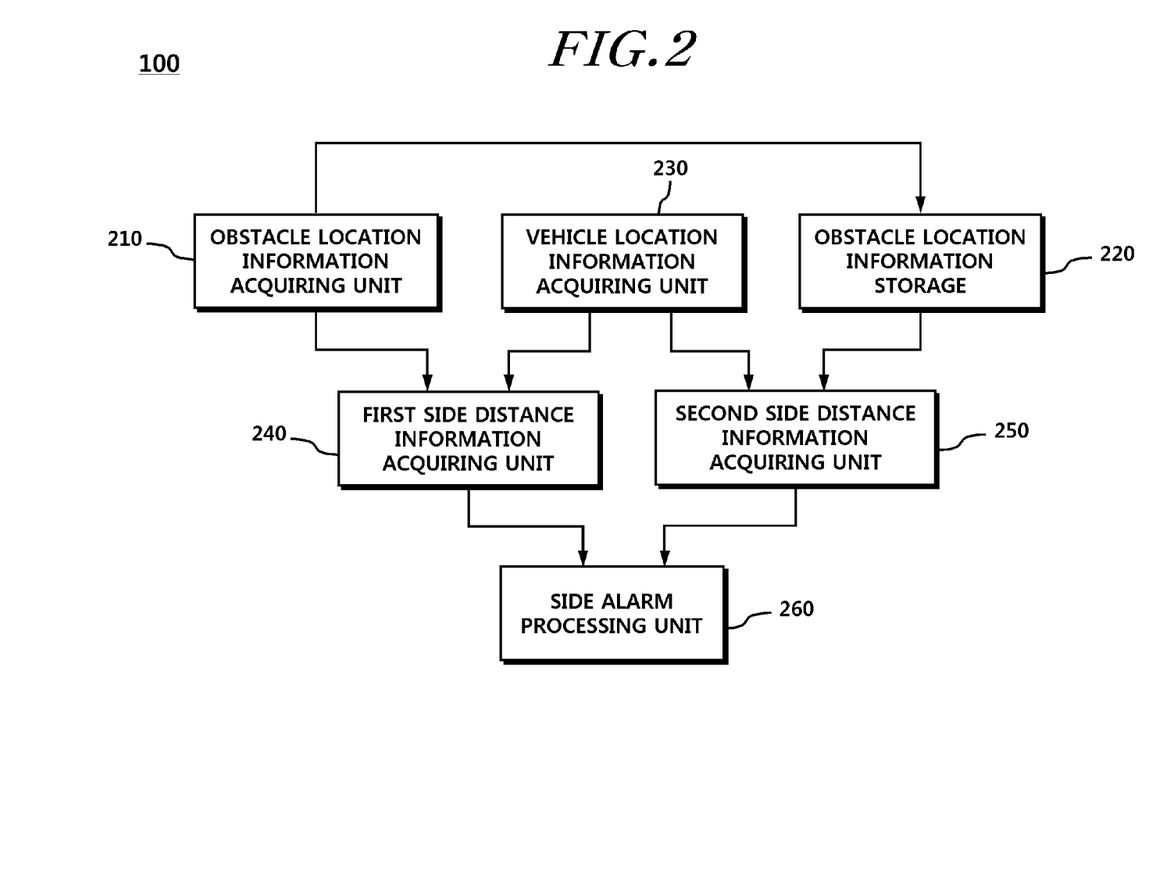
FIG. 2 is a block diagram of the parking control apparatus according to the exemplary embodiment of the present invention.

FIG. 2 is a block diagram of the parking control apparatus 100 according to the exemplary embodiment of the present invention.

Referring to FIG. 3, the parking control apparatus 100 according to the embodiment of the present invention includes an obstacle location information acquiring unit 210 repetitively acquires obstacle location informations based on distance informations from the vehicle to an obstacle on a periphery of a parking space through sensors installed to a vehicle while the vehicle moves under parking control to park on the parking space, and an obstacle location information storing unit 220 storing and updating the acquired obstacle location informations from the obstacle location information acquiring unit 210.

The parking control apparatus 100 further includes a vehicle location information acquiring unit 230 for repetitively acquiring vehicle location information based on at least one of wheel signal and steering angle signal while the vehicle moves under parking control to park on the parking space.

The parking control apparatus 100 further includes a first side distance information acquiring unit 240 acquiring a first side distance information from a side part of the vehicle to the obstacle based on an obstacle location information currently acquired from the obstacle location information acquiring unit 210 and a vehicle location information from the vehicle location information acquiring unit 230 if the obstacle location information acquiring unit 210 may acquire the obstacle location information through sensors.

The parking control apparatus 100 further includes a second side distance information acquiring unit 250 for acquiring a second side distance information from the side part of the vehicle to the obstacle based on an obstacle location information previously stored at the obstacle location information storing unit 220 and the vehicle location information currently acquired from the vehicle location information acquiring unit 230 if the obstacle location information acquiring unit 210 may not acquire the obstacle location information through the sensors.

The parking control apparatus 100 further includes a side alarm providing unit 250 for providing an alarm for collision risk of the vehicle according to comparison between a reference distance information and the first side distance information or the second side distance information.

Hereinafter, a method for providing an alarm according to the embodiment of the present invention will be described in more detail with reference to FIG. 3.

Figure 3:
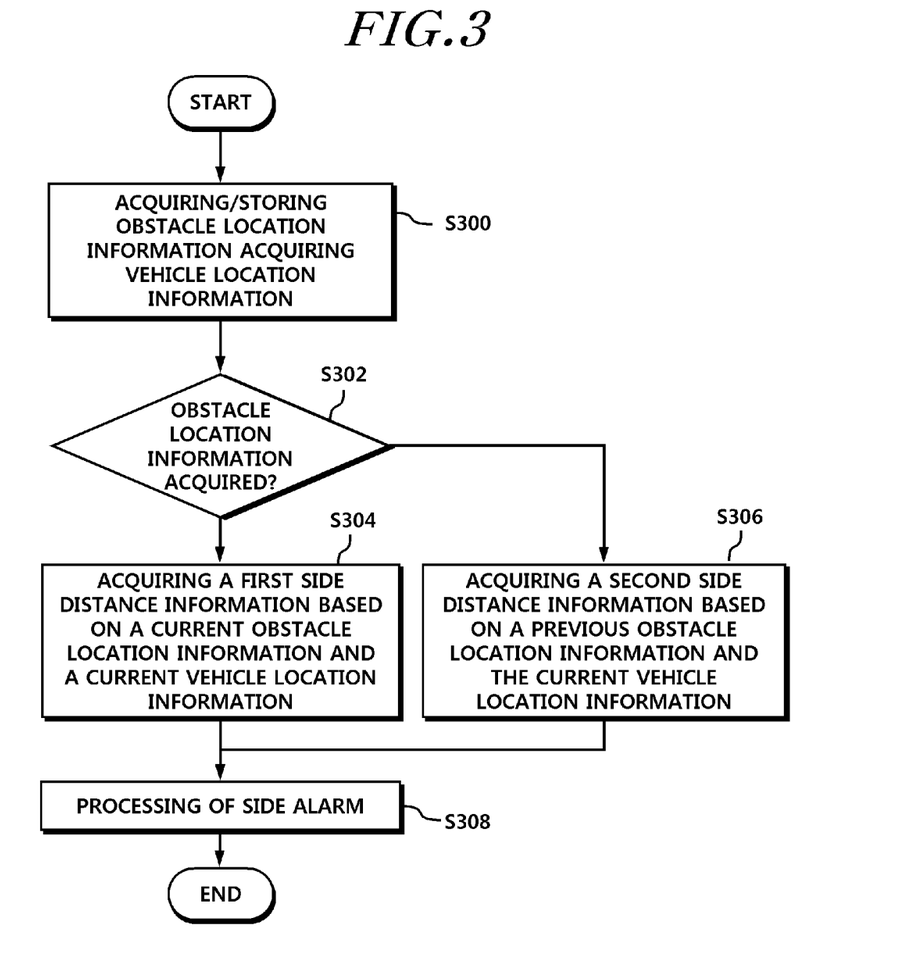
FIG. 3 is a flowchart of a method for providing an alarm by the parking control apparatus of the exemplary embodiment of the present invention.

FIG. 3 is a flowchart of a method for providing an alarm by the parking control apparatus of the exemplary embodiment of the present invention.

Referring to FIG. 3, the method for providing an alarm by the parking control apparatus 100 according to the embodiment of the present invention, includes the step of acquiring vehicle location informations repetitively based on at least one of wheel signal and steering angle signal, and repetitively acquiring to store obstacle location informations based on distance informations from a vehicle to an obstacle on a periphery of a parking space through sensors installed to the vehicle while the vehicle moves under parking control to park on the parking space (S300).

The method determines whether obstacle location information is obtainable (S302) and acquires a first side distance information from a side part of the vehicle to the obstacle based on a currently acquired obstacle location information and a currently acquired vehicle location information if the obstacle location information is obtainable (S304) and acquires a second side distance information from the side part of the vehicle to the obstacle based on a previously stored obstacle location information and the currently acquired vehicle location information if the obstacle location information is not obtainable(S306).

The method further provides an alarm for a broadside collision risk of the vehicle according to comparison between reference distance information and either the first side distance information or the second side distance information (S308).

The step S300 may acquire a vehicle location information changed from a reference location information according to a movement distance and a rotation angle based on at least one of the wheel signal and the steering angle signal. The reference location information is a vehicle location information at a time when the parking control starts.

In the step S306, the side part of the vehicle is not installed with any sensor. Therefore, the obstacle location information is not obtainable through the sensor. Instead, the previously stored obstacle location information may be used to acquire a side distance information (the second side distance information) from the side of the vehicle to the obstacle.

Even though the steps for providing an alarm according to the embodiment of the invention are described above referring to FIG. 3, this is only for illustrative purpose, therefore, two or more steps may be coupled as a single step or a single step may be separated into two or more steps within the scope of the present invention.

FIGS. 4 and 5 are drawings illustrating examples of controlling side impact protection alarms by the parking control apparatus 100 according to the exemplary embodiment of the present invention.

Referring to FIG. 4, the parking control apparatus 100 according to the embodiment of the present invention control a vehicle equipped with the parking control apparatus 100 to park the vehicle on a parking space between obstacles A and B along the dotted line (including routes searching for the parking space and a parking route). The parking control apparatus 100 acquires obstacle location informations using a sensor 11 among sensors installed to the vehicle and store the acquired obstacle location information and acquires vehicle location information based on at least one of wheel signal and steering angle signal while the vehicle moves along the dotted line.

If the parking control apparatus 100 may acquire the obstacle location information using the sensor 11, as described at FIG. 4, while the vehicle moves along the dotted line (including routes searching for the parking space and a parking route) to park on the parking space between the obstacles A and B, the parking control apparatus 100 acquires a first side distance information 400 from a side part of the vehicle to the obstacle B based on a currently acquired obstacle location information and a currently acquired vehicle location information using the sensor A 11. If the acquired first side distance information 400 is smaller or equal to a reference distance information then the parking control apparatus 100 may provide a side alarm.

From the location at FIG. 4, the vehicle moves more toward the parking space between the obstacles A and B as shown in FIG. 5, the parking control apparatus 100 may not currently acquire the obstacle location information since a side part of the vehicle nearest to the obstacle B is not installed with the sensor 11. Thus, in this case, the conventional parking control device may not provide an alarm for side impact protection.

However, even in the case as shown in FIG. 5, the parking control apparatus 100 according to the embodiment of the present invention may acquire a second side distance information 500 from the side part of the vehicle to the obstacle B using the "previously stored obstacle location information" and the currently acquired vehicle location information, and provide a side alarm by comparing the acquired second side distance information 500 with the reference distance information.

Figure 6:
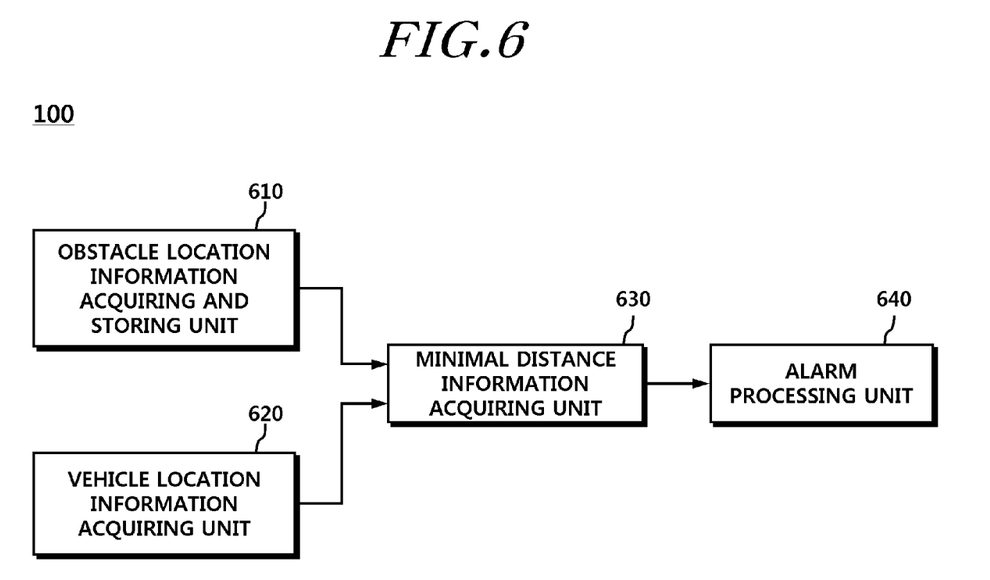
FIG. 6 is a block diagram of a parking control apparatus according to another exemplary embodiment of the present invention.

FIG. 6 is a block diagram of a parking control apparatus according to another exemplary embodiment of the present invention.

Referring to FIG. 6, the parking control apparatus according to another embodiment of the present invention includes an obstacle location information acquiring and storing unit 610 for repetitively acquiring and storing obstacle location informations based on distance informations from a vehicle to an obstacle on a periphery of a parking space through sensors installed to the vehicle while the vehicle moves under parking control to park on the parking space, and a vehicle location information acquiring unit 620 for repetitively acquiring vehicle location information based on at least one of wheel signal and steering angle signal while the vehicle moves under parking control to park on the parking space.

The parking control apparatus further includes a minimal distance information acquiring unit 630 for acquiring a first minimal distance information from the vehicle to the obstacle based on a currently acquired obstacle location information and a currently acquired vehicle location information if the obstacle location information is obtainable, and for acquiring a second minimal distance information from the side part of the vehicle to the obstacle based on a previously stored obstacle location information and the currently acquired vehicle location information if the obstacle location information is not obtainable.

The parking control apparatus further includes an alarm providing unit 640 for providing an alarm for collision risk of the vehicle according to comparison between reference distance information and either the first minimal distance information or the second minimal distance information.

As described above, according to the present invention, it is possible to provide an alarm accurately as detecting a collision risk of a vehicle with an obstacle in advance during all the time while the vehicle moves under parking control.

In addition, according to the present invention, it is possible to provide an alarm accurately as detecting a broadside collision risk of a side of a vehicle with an obstacle in advance even when location information on the obstacle is not obtainable through a sensor while the vehicle moves under parking control.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:
1. A method for providing an alarm by a parking control apparatus comprising:
    acquiring vehicle location informations repetitively based on at least one of wheel signal and steering angle signal, and repetitively acquiring to store obstacle location informations based on distance informations from a vehicle to an obstacle on a periphery of a parking space through sensors installed to the vehicle while the vehicle moves under parking control to park on the parking space;

acquiring a first side distance information from a side part of the vehicle to the obstacle based on a currently acquired obstacle location information and a currently acquired vehicle location information if the obstacle location information is obtainable;

acquiring a second side distance information from the side part of the vehicle to the obstacle based on a previously stored obstacle location information and the currently acquired vehicle location information if the obstacle location information is not obtainable; and providing a side alarm for a broadside collision risk of the vehicle according to comparison between reference distance information and either the first side distance information or the second side distance information.

2. The method of claim 1, wherein the acquiring of the vehicle location information acquires a vehicle location information moved from a reference location information according to a movement distance and a rotation angle based on at least one of the wheel signal and the steering angle signal, wherein the reference location information is a vehicle location information at a time when the parking control starts.

3. The method of claim 1, wherein in the second side distance acquiring step the side part of the vehicle is not installed with any sensor.

4. A parking control apparatus comprising:

an obstacle location information acquiring unit for repetitively acquiring obstacle location informations based on distance informations from a vehicle to an obstacle on a periphery of a parking space through sensors installed to the vehicle while the vehicle moves under parking control to park on the parking space;

an obstacle location information storing unit for storing the acquired obstacle location informations while the vehicle moves under parking control;

a vehicle location information acquiring unit for repetitively acquiring vehicle location information based on at least one of wheel signal and steering angle signal while the vehicle moves under parking control to park on the parking space;

a first side distance information acquiring unit acquiring a first side distance information from a side part of the vehicle to the obstacle based on a currently acquired obstacle location information and a currently acquired vehicle location information if the obstacle location information is obtainable;

a second side distance information acquiring unit for acquiring a second side distance information from the side part of the vehicle to the obstacle based on a previously stored obstacle location information and the currently acquired vehicle location information if the obstacle location information is not obtainable; and a side alarm providing unit for providing an alarm for collision risk of the vehicle according to comparison between a reference distance information and either the first side distance information or the second side distance information.

5. A parking control apparatus comprising:

an obstacle location information acquiring and storing unit for repetitively acquiring and storing obstacle location informations based on distance informations from a vehicle to an obstacle on a periphery of a parking space through sensors installed to the vehicle while the vehicle moves under parking control to park on the parking space;

a vehicle location information acquiring unit for repetitively acquiring vehicle location information based on at least one of wheel signal and steering angle signal while the vehicle moves under parking control to park on the parking space;

a minimal distance information acquiring unit for acquiring a first minimal distance information from the vehicle to the obstacle based on a currently acquired obstacle location information and a currently acquired vehicle location information if the obstacle location information is obtainable, and for acquiring a second minimal distance information from the side part of the vehicle to the obstacle based on a previously stored obstacle location information and the currently acquired vehicle location information if the obstacle location information is not obtainable; and an alarm providing unit for providing an alarm for collision risk of the vehicle according to comparison between reference distance information and either the first minimal distance information or the second minimal distance information.

* * * * *